No. 860,017. PATENTED JULY 13, 1907.
J. A. CUNEO.
CHECK VALVE.
APPLICATION FILED FEB. 8, 1907.
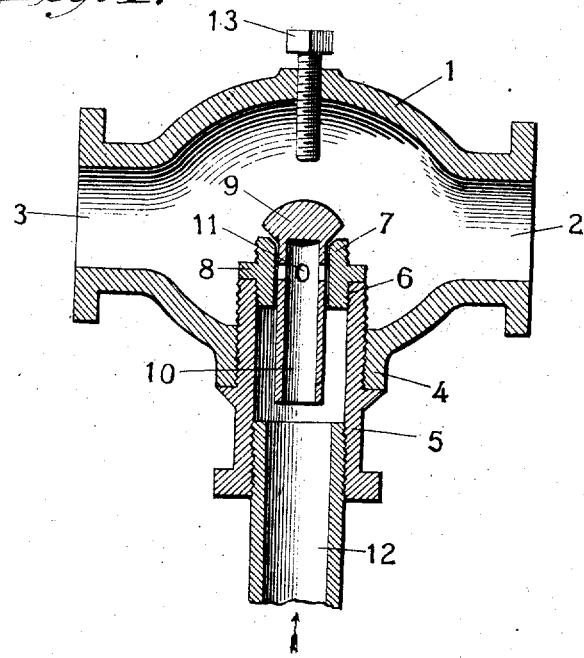
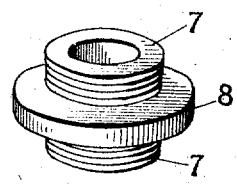

UNITED STATES PATENT OFFICE.

JOHN ANTONIO CUNEO, OF SHIPPENSVILLE, PENNSYLVANIA.

CHECK-VALVE.

No. 860,017.  Specification of Letters Patent.  Patented July 16, 1907.

Application filed February 8, 1907. Serial No. 356,405.

*To all whom it may concern:*

Be it known that I, JOHN ANTONIO CUNEO, a citizen of the United States, residing at Shippensville, Clarion county, Pennsylvania, have invented certain new and useful Improvements in Check-Valves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to check valves, and has for its object to provide a simple and efficient valve wherein the valve and its seat are readily removable from the valve case, together with details of construction hereinafter more particularly described and claimed.

Referring to the drawings, in which like parts are similarly designated—Figure 1 is a longitudinal central section through the valve and its casing, and Fig. 2 is a perspective view of the reversible, removable valve seat.

The valve case proper preferably, but not necessarily, consists of a union 1 having a flange connection 2 at one end, designed to lead to a steam boiler or other device, and a flange connection 3 at the other end designed to lead to a blow-off from said boiler, and between the two flanges 2 and 3 the union 1 has an internally threaded nipple 4 in which is screwed a sleeve or gland 5 internally threaded at its inner end 6. Within the threaded inner end of the gland 5 is a readily removable, reversible valve seat, consisting of a tubular portion 7 externally threaded and having between its ends, preferably but not necessarily midway between its ends, a seating flange 8 adapted to seat on the end of the gland 5.

The valve has a rounded or other suitably shaped top 9, of solid metal, seating on the end of the seat, and a central tubular stem 10 provided with fluid passages 11. The valve is moved from its seat by the inflow of water or other fluid through a pipe 12 screwed into the gland 5 or otherwise fitted thereto.

The lift of the valve is limited, and the distance of lift is adjusted by means of a screw 13, screwed through the union 1 directly over the top of the valve. Water to be admitted to the boiler will enter pipe 12, lift the valve 9, cause the passages 11 to be moved above the upper edge of the removable, reversible seat, and thereby permit the water to flow through said openings by way of the passage 2 to the boiler.

It will be noted that the diameter of the largest part of the removable, reversible seat, that is, the flange 8, is not greater than the external diameter of the gland, so that by removing the gland 5 the seat and valve may be removed with it. If the seat becomes worn at its contact surface with the mushroom head 9, it may be either trimmed down, or removed from the gland and reversed, so as to present the lower, unworn end to the valve.

I claim—

1. The combination with a pipe union having pipe connecting members at its ends, and a threaded nipple between the ends; of a gland screwed into said nipple and projecting into the union, a tubular valve seat externally threaded and having a central flange seated on the end of the gland, a mushroom valve having a solid head and a tubular stem extending through the seat and into the gland with passages through said stem and a screw in the top of the union over the head of the valve to adjust and limit the lift of said valve said seat and valve removable with the gland.

2. The combination with a pipe union having an internally threaded nipple between its ends, a gland taking into the nipple, a reversible valve seat secured on the end of the gland and a valve having a hollow perforated stem passing through the valve seat into the gland, the diameter of the valve and valve seat not being greater than the external diameter of the gland, whereby when the gland is removed all operative parts will be removed from the union.

In testimony that I claim the foregoing as my invention, I have signed my name in presence of two subscribing witnesses.

JOHN ANTONIO CUNEO.

Witnesses:
FRANK C. RIELY,
WILLIAM T. MADDEN.